United States Patent [19]

Mery

[11] Patent Number: 4,669,583

[45] Date of Patent: Jun. 2, 1987

[54] DISC BRAKE WITH SLIDING CALLIPER

[75] Inventor: Jean-Claude Mery, Pavillons-sous-Bois, France

[73] Assignee: Bendix France, Paris, France

[21] Appl. No.: 816,924

[22] Filed: Jan. 7, 1986

[30] Foreign Application Priority Data

Jan. 23, 1985 [FR] France .............................. 85 00923

[51] Int. Cl.$^4$ ...................... F16D 65/40; F16D 65/14
[52] U.S. Cl. ............................ 188/73.38; 188/205 A
[58] Field of Search ............... 188/73.36, 73.37, 73.38, 188/73.45, 73.47, 205 A, 73.35; 192/30 V

[56] References Cited

U.S. PATENT DOCUMENTS

| | | | |
|---|---|---|---|
| 3,480,116 | 11/1969 | Rath et al. | 188/73.35 |
| 4,394,891 | 7/1983 | Oshima | 188/73.38 |

FOREIGN PATENT DOCUMENTS

| | | | |
|---|---|---|---|
| 1927459 | 5/1970 | Fed. Rep. of Germany . | |
| 1548356 | 12/1968 | France . | |
| 2295300 | 7/1976 | France . | |
| 0065733 | 5/1980 | Japan | 188/73.37 |
| 1267199 | 3/1972 | United Kingdom . | |
| 1528124 | 10/1978 | United Kingdom . | |
| 1577421 | 10/1980 | United Kingdom . | |
| 2159220 | 11/1985 | United Kingdom | 188/73.45 |

*Primary Examiner*—Andres Kashnikow
*Assistant Examiner*—Robert J. Oberleitner
*Attorney, Agent, or Firm*—Larry J. Palguta; Ken C. Decker

[57] ABSTRACT

The invention concerns a disc brake with a sliding calliper (10) incorporating two shafts for guiding and holding two friction components (20, 24) which are capable of being actuated by a brake actuator (18), and incorporating a spring for noise suppression (32) consisting of a metal leaf in the general shape of a cross incorporating two bearing arms formed on each side of a central axial portion (34), the arms bearing radially against the shafts, the central portion cooperating in bearing with external peripheral portions of the friction components (20, 24). Of the ends (46, 54) of the central portion (34), one end (46) incorporates an extension (44) which enters with a predetermined radial clearance into a hole (48) formed facing it in the calliper (10).

11 Claims, 7 Drawing Figures

FIG_1

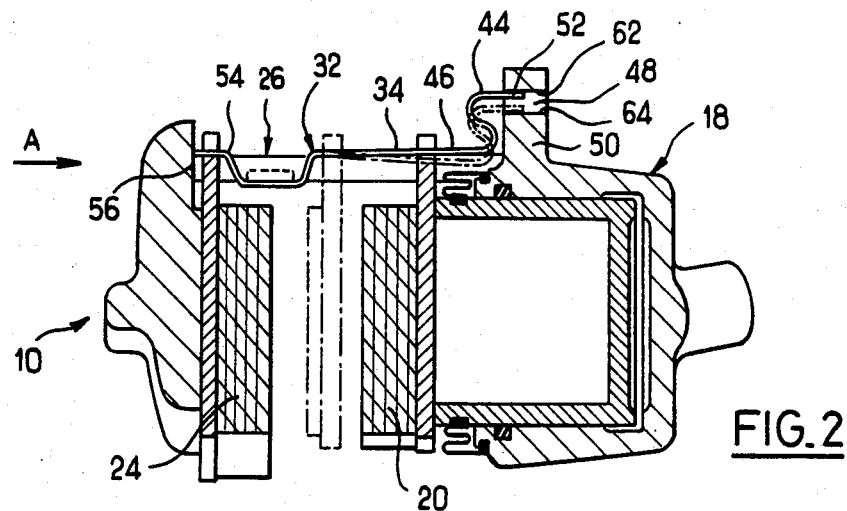
FIG. 2
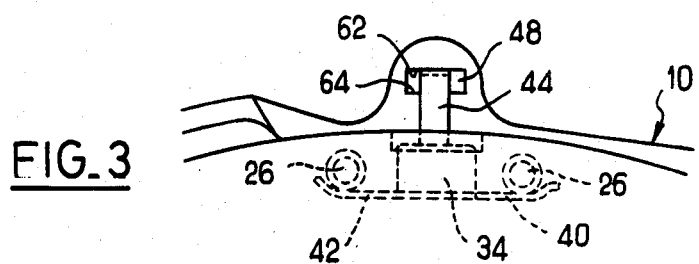
FIG. 3
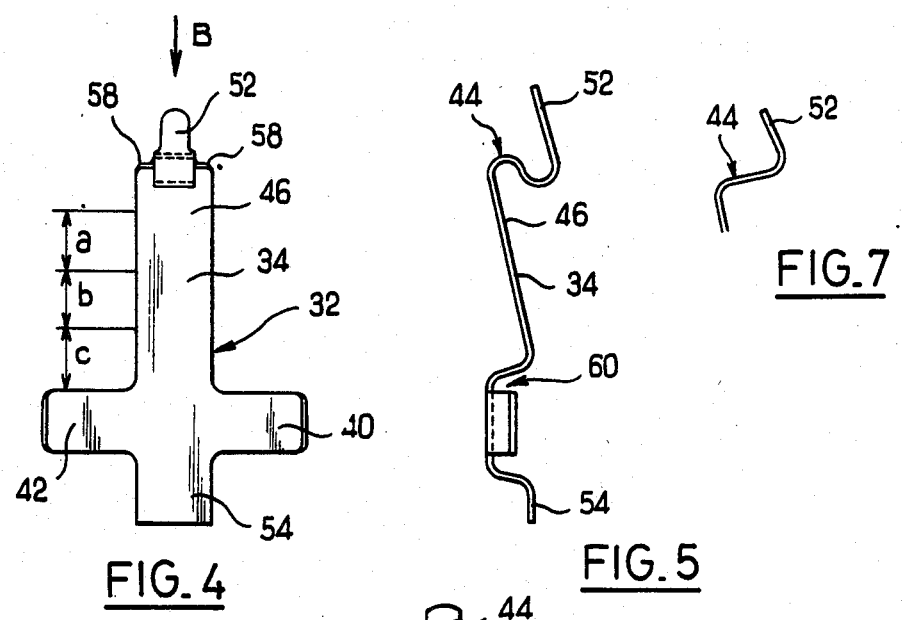
FIG. 4
FIG. 5
FIG. 7
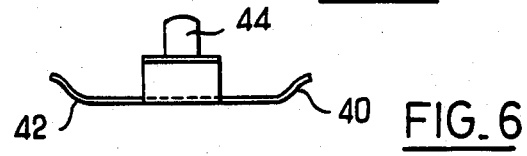
FIG. 6

DISC BRAKE WITH SLIDING CALLIPER

The invention concerns a disc brake with a sliding calliper particularly for motor vehicles. The invention concerns more particularly a disc brake of the type with a sliding calliper incorporating two shafts for guiding and for holding two friction components which are capable of being actuated by a brake actuator, the disc brake also incorporating a spring for noise suppression consisting of a metal leaf in the general shape of a cross incorporating two bearing arms formed on each side of a central axial portion, the arms bearing radially against the shafts, the central portion cooperating in bearing with external peripheral portions of the friction components.

A brake of this type is described in British Patent GB-1,577,421. However, the solution proposed has the major disadvantage in that the spring for noise suppression can be mounted the opposite way round, that is to say that the hook portion would be situated not on the outer pad but on the inner pad. Consequently, firstly, the spring would have to move with the inner pad at each braking application generating interference friction between the spring and the guide shafts, and secondly, the free end of the main body of the spring would be situated on the side opposite the brake actuator, that is to say towards the wheel of the vehicle, and therefore during the movement of the inner friction component the free end of the spring moves relative to the calliper and may leave the space allowed by the wheel of the vehicle, causing the spring to rub against the wheel, which may bring about the destruction of the spring. Consequently, the greater the thickness of the friction components for wear, the greater is this movement and consequently the protrusion of the spring past the calliper.

The spring described in the British Patent mentioned above nevertheless has another disadvantage. The construction described ensures an essentially constant force on the friction components owing to, among other things, the flexibility of the arms bearing against the guide shafts. This requires a substantial separation of the shafts relative to the central portion of the spring in order to allow the arms to be sufficiently flexible to undergo the necessary elastic deflections. If the shafts are situated very close to the central portion of the spring, the arms no longer possessing the required elasticity, the force applied to the friction components is practically uncontrollable and may be either too high or practically zero, particularly depending the position of the inner friction component relative to the pad spring.

The aim of the invention is to propose a disc brake of the type described above in which all these disadvantages are eliminated while retaining the advantages of the latter.

For this purpose the invention proposes a disc brake with a sliding calliper incorporating two shafts for guiding and for holding two friction components which are capable of being actuated by a brake actuator and incorporating a spring for noise suppression consisting of a metal leaf in the general shape of a cross incorporating two bearing arms formed on each side of a central axial portion, the arms bearing radially against the said shafts, the central portion cooperating in bearing with external peripheral portions of the friction components, characterized in that one end of the central portion incorporates an extension which enters into a hole formed facing it in the calliper.

It is clear that, owing to such a construction, the spring can be mounted only when the extension enters into the hole provided and consequently a reversed mounting is impossible.

Another aim of the present invention is to limit the variations in force of the spring applied to the friction components.

To achieve this, according to another characteristic of the invention, the extension cooperates radially and elastically with the hole for at least one zone of positions of the friction component relative to the central portion.

With such an arrangement, the radial cooperation of the extension with the edges of the hole allows the force of the spring upon the friction components to be increased or reduced, according to the support chosen in the hole, namely external support or internal support.

Other characteristics and advantages of the disc brake forming the subject of the present invention will emerge from the following description of an embodiment, given by way of illustration but not limiting in any way, with reference to the accompanying drawings, in which:

FIG. 2 is a view showing an axial section through the section plane II—II shown in FIG. 1;

FIG. 3 is a partial view in the direction of the arrow A shown in FIG. 2;

FIG. 4 is an enlarged plan view of a pad spring for the brake shown FIG. 1;

FIG. 5 is a side view of the spring shown in FIG. 4 in the free condition;

FIG. 6 is a front view of the spring shown in FIG. 4; and

FIG. 7 shows a partial variant of FIG. 5.

Figure 1:
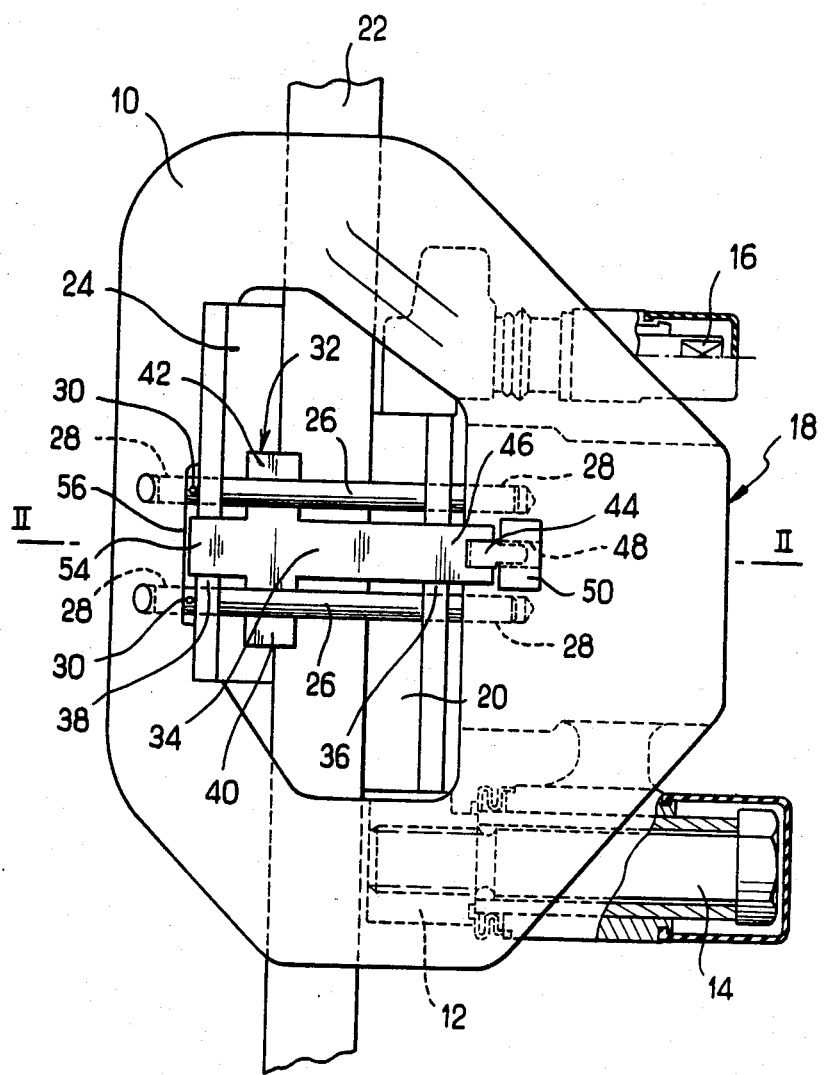
FIG. 1 is a plan view in partial section of a disc brake with sliding calliper constructed in accordance with the invention.

The disc brake shown in FIGS. 1, 2 and 3 incorporates a sliding calliper given as an assembly the reference 10 mounted on a fixed support or component 12 which is capable of being fixed to a fixed portion of the vehicle (not shown). The calliper 10 is mounted so as to slide on the fixed support 12 by means of two pillars 14 and 16 screwed into the fixed support 12 and passing through bores formed in the calliper 10. A brake actuator given as an assembly the reference 18 is capable of acting directly upon a first friction component 20 in such a way as to push the latter so as to bear against a disc to be braked 22 and, by reaction through the sliding calliper 10, to apply a second friction component 24 against the disc 22. In a conventional manner, the friction component 20 is anchored in the fixed support 12 while the friction component 24 is anchored directly to the sliding calliper 10. The two friction components 20 and 24 are guided and held by two shafts for guiding and holding 26 mounted in holes 28 formed in the calliper 10, the two shafts being immobilized relative to the calliper 10 by means of pins or similar devices 30 positioned between the calliper and the friction component 24, for example. A spring for noise suppression given as an assembly the reference 32 incorporates a central portion 34 which bears against peripheral portions 36 and 38, respectively, of the friction components 20 and 24, and incorporates two bearing arms 40 and 42 formed on each side of the central portion 34 and bearing radially against the two shafts 26.

In accordance with the invention, the central portion 34 of the spring 32 incorporates an extension 44 formed at one end 46 of the central portion 34, this extension 44 entering into a hole 48 formed in a lug 50 which is firmly fixed to the calliper 10. More precisely, the free end 52 of the extension 44 enters into the hole 48. Referring to FIGS. 2 and 3, it is seen that the free end 52 lies generally parallel to the central portion 34 and that this end 52 is mounted with radial clearance in the hole 48, that is to say that the hole 48 has a dimension which, in the radial direction, is greater than the thickness of the free end 52, thus defining a radial clearance between this end 52 and the hole 48. The other end 54 of the central portion 34 passes axially beyond the friction component 54, away from the brake actuator 18, and faces a frontal surface 56 formed on the calliper 10.

Referring to FIGS. 4, 5 and 6, which show the spring 32 before being mounted on the calliper 10, it is seen that the extension 44 has the general shape of a Z terminating in the free end 52 with a width which is less than that of the central portion 34. This change in width forms a double shoulder 58 positioned very close to the lug 50 as shown in FIG. 2, thus ensuring together with the end 54 the axial positioning of the spring 32 relative to the calliper 10. Axial here means a direction parallel to the axis of rotation of the disc 22 or parallel to the axis of the brake actuator 18.

Referring to FIGS. 5 and 6, it is seen that, in the embodiment shown, the arms 40 and 42 are positioned on each side of the central portion 34 which at this point has the shape of a channel 60 for reasons of space occupied by the brake, this channel 60 not being required for the invention. It will be noted that the arms 40 and 42 are formed close to the end 54 and are essentially rigid owing to their short length. Referring to FIG. 5, it is seen that, starting from the channel 60, the central portion 34 forms an angle relative to the end 54 and to the arms 40 and 42, and that the same applies to the free end 52 which remains essentially parallel to the central portion 34. The value of the angle depends on the rigidity of the material used and on the forces which are required to be applied to the friction components.

FIG. 7 shows a variant of the extension 44 which gives less flexibility to the Z-shaped portion of the extension 44 than the shape shown in FIG. 5.

Referring to FIGS. 3 and 6, it is seen that the ends of the, arms 40 and 42 are radially curved in such a way as to immobilize the spring 32 relative to the shafts 26 in the transverse direction.

Referring to FIG. 2, it is seen that, when the spring is mounted on the brake, and the friction components are new, the central portion 34 is essentially straight and parallel to the axis of the disc 22. In these conditions, it is seen that the free end 52 bears against an outer edge 62 of the hole 48. FIG. 2 shows in dotted lines the friction component 20 when the two friction components 20 and 24 are close to their maximum limit of wear. In these conditions, the central portion 34, and more precisely its end 46, moves towards the axis of the disc 22, the extension 44 and more precisely the free end 52 of the latter coming to bear internally against an inner edge 64 of the hole 48, and for this position the spring 32 is partially shown by dotted lines.

Mounting the friction components on the brake described with reference to FIGS. 1 and 3 is carried out in the following manner:

A shaft 26 is introduced into its hole 28 on the side remote from the brake actuator 18, then the friction component 24 is placed in position and this shaft 26 is passed through a hole provided in the friction component 24, and the latter is then held by this shaft 26. The friction component 20 is placed in position in the fixed support 12 and the spring 32 is next mounted ensuring that the end 54 is correctly seated on the peripheral portion 38 of the friction component 24 after having engaged the free end 52 of the extension 54 into the hole 48; in these conditions the spring 32 is seated upon both the friction components 20 and 24, and the end 52 is correctly positioned. By bearing against the central portion 34 causing it to bend, the shaft 26 is introduced over the arm 40 of the spring 42, then by introducing further the shaft 26 the latter is passed through a hole formed in the friction component 20 and is then entered into the hole 28 formed in the calliper 10. This shaft 26 is then locked by means of a pin or similar device. By maintaining the pressure on the central portion 34 the second shaft 26 is engaged in the same way into these holes 28 through holes formed in the friction components 20 and 24, making sure that this second shaft 26 also passes over the second arm 42 of the spring 32. The force exerted on the central portion 34 is then released.

In the embodiment shown, three zones marked a, b and c are defined on the spring 32, and more precisely, on the central portion 34, starting from the end 46 and proceeding towards the arms 40 and 42 as shown in FIG. 4. The first of these three zones a corresponds to the position of the friction component 20 when the two friction components 20 and 24 are new or unworn, the second zone b corresponds to the middle of the wear of the friction components and the third c corresponds to the position of the friction component 20 relative to the spring 32 when the friction components are close to their limit of wear. Referring to FIGS. 2 and 4, it is seen that, when the friction components are new, the lever arm on the spring 32 is a maximum and therefore the radial force applied to the friction component 20, and by reaction on the friction component 24, is a minimum, and conversely, when the friction components are at the limit of wear, the lever arm being at a minimum, the radial force applied to the friction components is at a maximum. In order to avoid these variations of force, when the friction component 20 is new, or more generally in the zone a, the free end 52 of the extension 44 cooperates elastically with the outer edge 62 of the hole 48 generating an elastic deformation of the extension 44, thus increasing the force upon the friction component 20. As wear of the friction components takes place, that is to say when the friction component 20 moves in the direction of the arrow B shown in FIG. 4 relative to the spring 32 through the zone a, the force applied by the central portion 34 increases but the force generated by the portion 44 is reduced, thus maintaining the force upon the friction component 20 essentially constant. When the friction component 20 reaches the zone b, the free end 52 is detached from the outer edge 62 and the force applied to the friction component 20 corresponds to the elasticity of the spring 32 itself. As the friction components become worn, the friction component 20 moves through the zone b while the free end 52 moves radially inside the opening 48 owing to the radial clearance existing between this end 52 and the two edges 62 and 64 of the opening 48. When the wear of the friction components 20 and 24 is such that the friction component 20 enters the zone c, the free end 52 comes into contact with the inner edge 64 of the hole 48, thus reducing the force upon the friction component 20 exerted by the spring 32.

This succession of the three zones allows the radial force exerted upon the friction components to be maintained essentially constant.

It is clear that the hole 48 can be defined in such a way as to be effective only for the zones a and b, or b and c, as a function of the permissible variations in the radial force applied to the friction components.

As may be seen from the above description, the brake which is the subject of the invention ensures that the spring for noise suppression 32 is correctly mounted without any risk of reverse mounting, and alllows the variations in radial forces applied by this spring to the friction components to be limited.

The radial positions of the outer edge 62 and the inner edge 64, and clearly their distance apart, allow the zones a, b and c, and in particular their widths, to be defined.

Although the present invention is described in relation to a particular embodiment it is not limited by that embodiment but on the contrary is capable of modifications and variants which will be apparent to a person versed in the art.

I claim:

1. A disc brake with a sliding caliper having two shafts for guiding and holding two friction members actuatable by a brake actuator in the caliper, comprising an anti-noise leaf spring in the general shape of a cross having two opposite lateral arms extending from a central axial portion, each arm in radial bearing engagement with a respective one of the shafts, the central portion in bearing engagement with outer peripheral portions of the friction members, wherein the central portion has one end extending axially beyond the associated friction member and provided with an extension extending axially into an aperture having two radially facing surfaces, the aperture formed in the caliper and opening axially toward said associated friction member.

2. The disc brake according to claim 1, wherein said extension has, in projection in a radial plane, the general shape of a Z, with a free end of said extension extending substantially parallel to the central portion and being received within said aperture which has a predetermined radial clearance.

3. The disc brake according to claim 1, wherein the central portion has an opposite end terminating adjacent a front radial surface of the caliper.

4. The disc brake according to claim 3, wherein said lateral arms are formed adjacent said opposite end of the central portion.

5. The disc brake according to claim 4, wherein said lateral arms are substantially rigid together with said opposite end, said one end being resiliently biased into bearing engagement with the outer peripheral portion of said associated friction member.

6. The disc brake according to claim 5, wherein said extension resiliently radially cooperates in engagement with one of said radially facing surfaces of said aperture for at least one range of positions of said associated friction member relative to said central portion.

7. The disc brake according to claim 6, wherein for another range of positions of said associated friction member relative to said central portion, said extension is received radially free of engagement in said aperture.

8. The disc brake according to claim 5, wherein three ranges of positions of said associated friction member relative to said central portion are predetermined, a first range corresponding to unworn friction members for which said extension cooperates radially outwardly with a radially outer one of said radially facing surfaces of said aperture, a second range corresponding to a middle wear condition of the friction members for which said extension is received radially free of engagement in said aperture, and a third range corresponding to a limit of wear of the friction members for which said extension cooperates radially inwardly with a radially inner one of said radially facing surfaces of said aperture.

9. The disc brake according to claim 3, wherein said lateral arms have radially curved ends for immobilizing the spring transversely relative to said shafts.

10. A disc brake with a sliding caliper having two shafts for guding and holding two friction members actuatable by a brake actuator in the caliper, comprising an anti-noise leaf spring in the general shape of a cross having two opposite lateral arms extending from a central axial portion, each arm in radial bearing engagement with a respective one of the shafts, the central portion in bearing engagement with outer peripheral portions of the friction members, wherein the central portion has one end extending axially beyond the associated friction member and provided with an extension extending axially into an axially extending aperture disposed in a radially extending lug connected with the caliper, the aperture having a radially facing inner surface and a radially facing outer surface and an opening facing axially in order to receive therein the extension, the extension having at least one bend so that the extension is disposed radially outwardly of said central portion and an end of the extension being resilient with respect to the central portion, the end received within the aperture and displaceable between the radially facing inner and outer surfaces.

11. The disc brake according to claim 10, wherein said end resiliently radially cooperates in engagement with one of said surfaces of said aperture for at least one range of positions of said associated friction member relative to said central portion.

* * * * *